(12) United States Patent
Xing et al.

(10) Patent No.: US 10,176,460 B2
(45) Date of Patent: Jan. 8, 2019

(54) ELECTRONIC BUSINESS CARD EXCHANGE METHOD AND APPARATUS

(71) Applicant: ORA INC., Beijing (CN)

(72) Inventors: Jian Hua Xing, Beijing (CN); Kai Ren, Beijing (CN); Ping Wang, Beijing (CN); Ye Zhao, Beijing (CN); Jian Guo Wu, Beijing (CN)

(73) Assignee: ORA INC., Beijing (CN)

( * ) Notice: Subject to any disclaimer, the term of this patent is extended or adjusted under 35 U.S.C. 154(b) by 0 days.

(21) Appl. No.: 15/514,470

(22) PCT Filed: Aug. 28, 2015

(86) PCT No.: PCT/CN2015/088343
§ 371 (c)(1),
(2) Date: Mar. 24, 2017

(87) PCT Pub. No.: WO2016/045481
PCT Pub. Date: Mar. 31, 2016

(65) Prior Publication Data
US 2017/0278068 A1    Sep. 28, 2017

(30) Foreign Application Priority Data

Sep. 26, 2014 (CN) .......................... 2014 1 0505364

(51) Int. Cl.
*H04B 7/00* (2006.01)
*G06Q 10/10* (2012.01)
(Continued)

(52) U.S. Cl.
CPC .......... *G06Q 10/109* (2013.01); *G06F 1/169* (2013.01); *G06F 1/1626* (2013.01);
(Continued)

(58) Field of Classification Search
CPC .. G06F 3/0488; G06F 3/04883; G06F 1/1626; G06F 1/169; G06Q 10/109;
(Continued)

(56) References Cited

U.S. PATENT DOCUMENTS

| | | | |
|---|---|---|---|
| 2005/0114788 A1* | 5/2005 | Fabritius | G06F 1/1626 715/767 |
| 2012/0220221 A1* | 8/2012 | Moosavi | H04M 1/274516 455/41.1 |
| 2015/0370458 A1* | 12/2015 | Chen | G06F 3/04845 715/727 |

* cited by examiner

*Primary Examiner* — Nhan Le
(74) *Attorney, Agent, or Firm* — J.C. Patents

(57) ABSTRACT

An electronic business card exchange method and apparatus. The method comprises: if a first electronic business card terminal on which a first electronic business card is displayed receives a first touch signal, the first electronic business card terminal turns the first electronic business card upside down to enable the business card to face the other party, and establishes a data connection to a second electronic business card terminal (101); if the first electronic business card terminal on which the first electronic business card that has been turned is displayed receives a second touch signal, the first electronic business card terminal sends the first electronic business card to the second electronic card terminal through the data connection (103); and through the data connection, the first electronic business card terminal receives and displays a second electronic business card sent by the second electronic business card terminal (104). Users can exchange electronic business cards by only sending two touch signals, so that the problems of complex operation of electronic business card exchange and proneness to opposite end confusion in the prior art are solved. In addition, the process is formal and meets business card exchange etiquette, and the problem is solved that electronic business card cannot be popularized (Continued)

on a large scale all the time to replace paper business cards due to the concern of etiquette in electronic business card exchange.

6 Claims, 3 Drawing Sheets

(51) Int. Cl.
  *G06F 3/0488* (2013.01)
  *H04M 1/725* (2006.01)
  *G06F 1/16* (2006.01)
  *H04M 1/2745* (2006.01)

(52) U.S. Cl.
  CPC ........ *G06F 3/0488* (2013.01); *G06F 3/04883* (2013.01); *H04M 1/274516* (2013.01); *H04M 1/7253* (2013.01); *H04M 1/72547* (2013.01); H04M 2250/04 (2013.01); *H04M 2250/06* (2013.01)

(58) Field of Classification Search
  CPC ......... H04M 1/274516; H04M 1/7253; H04M 1/72547; H04M 2250/04; H04M 2250/06
  See application file for complete search history.

ELECTRONIC BUSINESS CARD EXCHANGE METHOD AND APPARATUS

BACKGROUND

Technical Field

The present invention is related to information technique, and more particular to an electronic business card exchange method and apparatus.

Related Art

The electronic business card information is a new business card form for carrying an entire information of a traditional paper business card by using an electronic document. The electronic business card information may be stored in intelligent electronic terminals. The user may use a communication connection between the intelligent electronic terminals to exchange the electronic business card. With the advance of paperless office, more and more paper products will be withdrawn from the stage of history. Compared with the traditional paper business card, the advantages of the electronic business card are obvious. The storage is convenient, quick and safe, and the manpower is saved and it has environmental protection.

In the prior art, when performing the electronic business card information exchange between two terminals, the both sides of the electronic business card exchange often need more complex operation to establish a connection between the intelligent electronic terminals. Then the operations, such as sending and receiving of the electronic business card, are performed in sequence. Finally it further needs to query the received electronic business card in a specified folder, and the electronic business card of the other party may be viewed after clicking and opening. Therefore, in the prior art, the operation of the electronic business card exchange is complex and the user experience is poor.

SUMMARY

An embodiment of the present invention provides an electronic business card exchange method and apparatus, so that the problems of complex operation of the electronic business card exchange in the prior art are solved.

An aspect of the embodiment of the present invention is to provide an electronic business card exchange method, which includes:

if a first electronic business card terminal on which a first electronic business card is displayed receiving a first touch signal, the first electronic business card terminal turning the first electronic business card upside down, and establishing a data connection to a second electronic business card terminal;

if the first electronic business card terminal on which the first electronic business card that has been turned is displayed receiving a second touch signal, the first electronic business card terminal sending the first electronic business card to a second electronic card terminal through the data connection; and through the data connection, the first electronic business card terminal receiving and displaying a second electronic business card sent by the second electronic business card terminal.

Another aspect of the embodiment of the present invention is to provide an electronic business card exchange apparatus, the electronic business card exchange apparatus is configured on a first electronic business card terminal, and the apparatus includes:

a connecting module, for if a first electronic business card terminal on which a first electronic business card is displayed receiving a first touch signal, the first electronic business card terminal turning the first electronic business card upside down, and establishing a data connection to a second electronic business card terminal;

a sending module, for if the first electronic business card terminal on which the first electronic business card that has been turned is displayed receiving a second touch signal, the first electronic business card terminal sending the first electronic business card to a second electronic card terminal through the data connection; and a receiving module, for through the data connection, the first electronic business card terminal receiving and displaying a second electronic business card sent by the second electronic business card terminal.

In the electronic business card exchange method and apparatus provided by the embodiment of the present invention, if the first electronic business card terminal on which the first electronic business card is displayed receives the first touch signal, the first electronic business card terminal turns the first electronic business card upside down to enable the business card to face the other party, and establishes the data connection to the second electronic business card terminal; if the first electronic business card terminal on which the first electronic business card that has been turned is displayed receives the second touch signal, the first electronic business card terminal sends the first electronic business card to the second electronic card terminal through the data connection; and through the data connection, the first electronic business card terminal receives and displays the second electronic business card sent by the second electronic business card terminal. That is, users can exchange electronic business cards by only sending two touch signals, so that the problems of complex operation of electronic business card exchange and proneness to opposite end confusion in the prior art are solved. In addition, the process is formal and meets business card exchange etiquette, and the problem is solved that electronic business card cannot be popularized on a large scale all the time to replace paper business cards due to the concern of etiquette in electronic business card exchange.

BRIEF DESCRIPTION OF THE DRAWINGS

In order to explain the technical solutions in the embodiments of the invention or in the prior art more clearly, the drawings used in the descriptions of the embodiments or the prior art will be simply introduced hereinafter. It is apparent that the drawings described hereinafter are merely some embodiments of the invention, and those skilled in the art may also obtain other drawings according to these drawings without going through creative work.

DETAILED DESCRIPTION

To make the objects, technical solutions and advantages of the embodiments of the present invention more clearly, the technical solutions of the present invention will be clearly and completely described hereinafter with reference to the embodiments and drawings of the present invention. Apparently, the embodiments described are merely partial embodiments of the present invention, rather than all embodiments. Other embodiments derived by those having ordinary skills in the art on the basis of the embodiments of the present invention without going through creative efforts shall all fall within the protection scope of the present invention.

The electronic business card terminal is an intelligent device including display screen, communication interface, CPU, memory and so on. The memory is used for storing the electronic business card to be exchanged, such as the electronic business card of the user using the electronic business card terminal.

Figure 1:
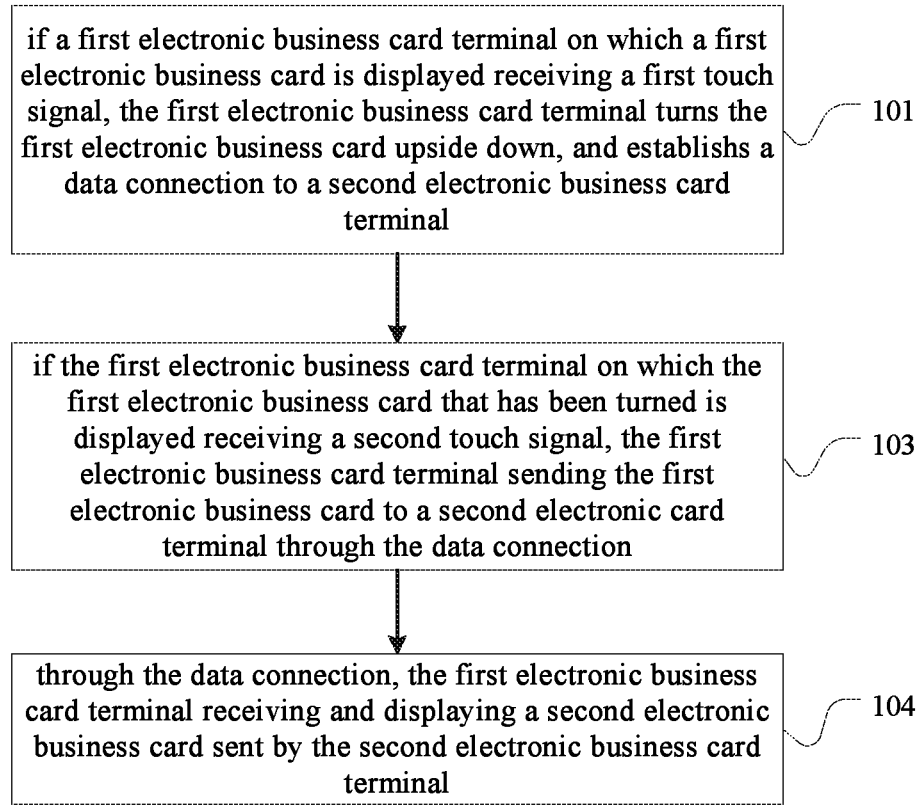
FIG. 1 is a flowchart of an electronic business card exchange method according to one embodiment of the present invention.

FIG. 1 is a flowchart of an electronic business card exchange method according to one embodiment of the present invention. As shown in FIG. 1, the electronic business card exchange method provided by the embodiment is used for performing the electronic business card exchange between a first electronic business card terminal and a second electronic business card terminal. The first electronic business card terminal stores a first electronic business card of the user of the first electronic business card terminal, and the second electronic business card terminal stores a second electronic business card of the user of the second electronic business card terminal. The electronic business card exchange method provided by the embodiment may include:

101: if a first electronic business card terminal on which a first electronic business card is displayed receiving a first touch signal, the first electronic business card terminal turns the first electronic business card upside down, and establishes a data connection to a second electronic business card terminal.

Wherein the first touch signal is a two-finger long press.

The first electronic business card terminal stores the first electronic business card of the user of the first electronic business card terminal, the first electronic business card terminal may display the stored first electronic business card after powering on, or may display the first electronic business card after capturing the preset operation signal. Then, if a first electronic business card terminal on which a first electronic business card is displayed receiving a first touch signal, the first electronic business card terminal turns the first electronic business card upside down, and establishes a data connection to a second electronic business card terminal. Specifically, the first electronic business card terminal performing an image process on the first electronic business card, so that the displayed first electronic business card turns up and down. When the user holds the first electronic business card terminal, the first electronic business card is a positive display before turning up and down and is a reverse display after turning up and down. Therefore, another user facing to the held first electronic business card terminal is capable of seeing the positive surface of the first electronic business card, i.e. the first electronic business card faces to the other party after turning up and down. Meanwhile, the first electronic business card terminal is based on near filed communication (NFC), Bluetooth or infrared, the first electronic business card terminal monitors and searches the second electronic business card terminal, and establishes a matching connection to the second electronic business card terminal; when the matching connection is successfully established, a connection of high speed wireless communication including wireless-fidelity (WIFI) and WIFI Direct is turned on.

It should be noted that the preset operation signal may be a sliding touch signal and may be a sound control signal, but it is not limited to this embodiment.

103: if the first electronic business card terminal on which the first electronic business card that has been turned is displayed receiving a second touch signal, the first electronic business card terminal sending the first electronic business card to a second electronic card terminal through the data connection.

Wherein the second touch signal is a two-finger sliding upward.

The first electronic business card terminal on which the first electronic business card that has been turned is displayed receives the second touch signal, the first electronic business card to a second electronic card terminal through the data connection, so that the second electronic business card terminal receives the first electronic business card through the data connection, and the second electronic business card terminal displays the first electronic business card.

104: through the data connection, the first electronic business card terminal receiving and displaying a second electronic business card sent by the second electronic business card terminal.

In order to clearly describe the embodiment, the embodiment further provides the corresponding operation process:

1. Two fingers press and hold the screen and the business card rotates 180 degrees, so that the positive surface of the business card faces to the receiver, and Wi-Fi is turned on and the data connection is established;

2. prompting that the data connection is successful, so that it may perform the electronic business card exchange, i.e. sending the electronic business card to the other party and receiving the electronic business card sent by the other party with each other;

3. Two fingers slide the business card upward to perform the electronic business card exchange;

4. after the exchange is successful, the business card of the other party is slid from top to bottom to enter a display interface and display the business card of the other party, and the processing and the storage of the subsequent data are finished at the same time; and 5. double-clicking the screen to switch to the display interface of the own electronic business card.

In the embodiment, if the first electronic business card terminal on which the first electronic business card is displayed receives the first touch signal, the first electronic business card terminal turns the first electronic business card upside down to enable the business card to face the other party, and establishes the data connection to the second electronic business card terminal; if the first electronic business card terminal on which the first electronic business card that has been turned is displayed receives the second touch signal, the first electronic business card terminal sends the first electronic business card to the second electronic card terminal through the data connection; and through the data connection, the first electronic business card terminal receives and displays the second electronic business card sent by the second electronic business card terminal. That is, users can exchange electronic business cards by only sending two touch signals, so that the problems of complex operation of electronic business card exchange and proneness to opposite end confusion in the prior art are solved. In addition, the process is formal and meets business card exchange etiquette, and the problem is solved that electronic business card cannot be popularized on a large scale all the time to replace paper business cards due to the concern of etiquette in electronic business card exchange.

Figure 2:
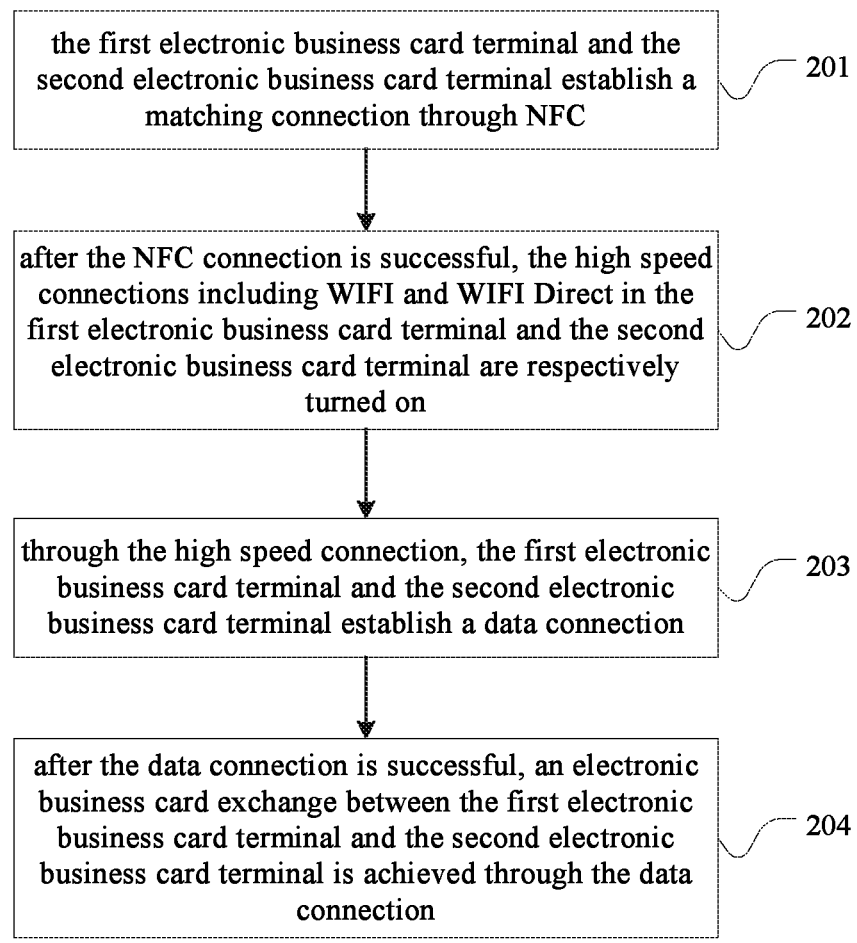
FIG. 2 is a flowchart of an electronic business card exchange method according to another embodiment of the present invention.

FIG. 2 is a flowchart of an electronic business card exchange method according to another embodiment of the present invention. As shown in FIG. 2, the electronic business card exchange method provided by the embodiment is used for performing the electronic business card exchange between a first electronic business card terminal and a second electronic business card terminal. The first electronic business card terminal stores a first electronic business card of the user of the first electronic business card terminal, and the second electronic business card terminal stores a second electronic business card of the user of the second electronic business card terminal. The electronic business card exchange method provided by the embodiment may include:

201: the first electronic business card terminal and the second electronic business card terminal establish a matching connection through NFC.

Specifically, if the first electronic business card terminal on which the first electronic business card is displayed receives a touch signal of a two-finger long press, the first electronic business card terminal establishes the matching connection to the second electronic business card terminal based on the NFC manner.

202: after the NFC connection is successful, the high speed connections including WIFI and WIFI Direct in the first electronic business card terminal and the second electronic business card terminal are respectively turned on.

Wherein the high speed connection adopts a high speed wireless communication manner, which includes, but not limited to WIFI, WIFI Direct and long term evolution (LTE).

203: through the high speed connection, the first electronic business card terminal and the second electronic business card terminal establish a data connection.

204: after the data connection is successful, an electronic business card exchange between the first electronic business card terminal and the second electronic business card terminal is achieved through the data connection.

Specifically, if the first electronic business card terminal on which the first electronic business card that has been turned is displayed receives a second touch signal, the first electronic business card terminal sends the first electronic business card to the second electronic card terminal through the data connection, and the first electronic business card terminal may receive and display the second electronic business card sent by the second electronic business card terminal through the data connection.

In the embodiment, if the first electronic business card terminal on which the first electronic business card is displayed receives the first touch signal, the first electronic business card terminal turns the first electronic business card upside down to enable the business card to face the other party, and establishes the data connection to the second electronic business card terminal; if the first electronic business card terminal on which the first electronic business card that has been turned is displayed receives the second touch signal, the first electronic business card terminal sends the first electronic business card to the second electronic card terminal through the data connection; and through the data connection, the first electronic business card terminal receives and displays the second electronic business card sent by the second electronic business card terminal. That is, users can exchange electronic business cards by only sending two touch signals, so that the problems of complex operation of electronic business card exchange and proneness to opposite end confusion in the prior art are solved. In addition, the process is formal and meets business card exchange etiquette, and the problem is solved that electronic business card cannot be popularized on a large scale all the time to replace paper business cards due to the concern of etiquette in electronic business card exchange.

Figure 3:
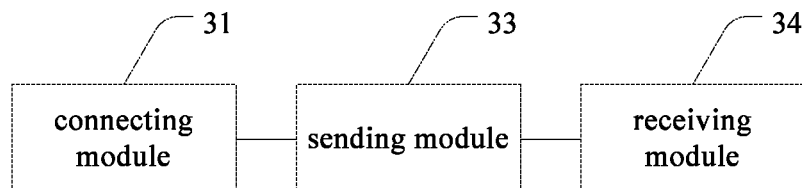
FIG. 3 is a schematic structure view of an electronic business card exchange apparatus according to one embodiment of the present invention.

FIG. 3 is a schematic structure view of an electronic business card exchange apparatus according to one embodiment of the present invention. As shown in FIG. 3, the electronic business card exchange apparatus provided by the embodiment is configured on a first electronic business card terminal. In the embodiment, the first electronic business card terminal stores a first electronic business card of the user of the first electronic business card terminal, and a second electronic business card terminal stores a second electronic business card of the user of the second electronic business card terminal. The apparatus provided by the embodiment may include: a connecting module 31, a sending module 33 and a receiving module 34.

The connecting module 31 is used for if a first electronic business card terminal on which a first electronic business card is displayed receiving a first touch signal, the first electronic business card terminal turning the first electronic business card upside down, and establishing a data connection to a second electronic business card terminal.

Wherein the first touch signal is a two-finger long press.

The sending module 33 is connected to a processing module 32 and is used for if the first electronic business card terminal on which the first electronic business card that has been turned is displayed receiving a second touch signal, the first electronic business card terminal sending the first electronic business card to a second electronic card terminal through the data connection.

Wherein the second touch signal is a two-finger sliding upward.

The receiving module 34 is connected to the sending module 33 and is used for through the data connection, the first electronic business card terminal receiving and displaying a second electronic business card sent by the second electronic business card terminal.

In the embodiment, if the first electronic business card terminal on which the first electronic business card is displayed receives the first touch signal, the first electronic business card terminal turns the first electronic business card upside down to enable the business card to face the other party, and establishes the data connection to the second electronic business card terminal; if the first electronic business card terminal on which the first electronic business card that has been turned is displayed receives the second touch signal, the first electronic business card terminal sends the first electronic business card to the second electronic card terminal through the data connection; and through the data connection, the first electronic business card terminal receives and displays the second electronic business card sent by the second electronic business card terminal. That is, users can exchange electronic business cards by only sending two touch signals, so that the problems of complex operation of electronic business card exchange and proneness to opposite end confusion in the prior art are solved. In addition, the process is formal and meets business card exchange etiquette, and the problem is solved that electronic business card cannot be popularized on a large scale all the time to replace paper business cards due to the concern of etiquette in electronic business card exchange.

Figure 4:
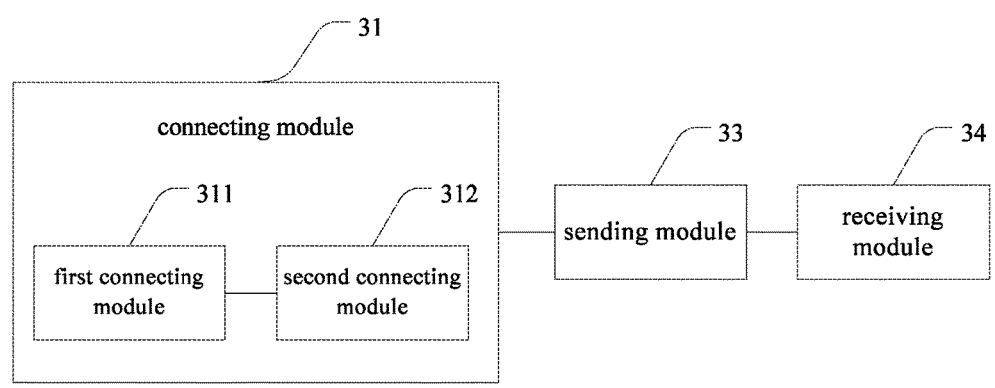
FIG. 4 is a schematic structure view of an electronic business card exchange apparatus according to another embodiment of the present invention.

FIG. 4 is a schematic structure view of an electronic business card exchange apparatus according to another embodiment of the present invention. As shown in FIG. 4, on the basis of the above embodiment, the connecting module 31 of the apparatus provided by the embodiment further includes: a first connecting module 311 and a second connecting module 312.

The first connecting module 311 is used for based on near field communication NFC or Bluetooth or infrared, the first electronic business card terminal monitoring and searching the second electronic business card terminal, and establishing a matching with the second electronic business card terminal and establishing a low speed connection.

The second connecting module 312 is used for when the low speed connection is successfully established, through the established low speed connection, transmitting an information matching needed by a high speed connection to establish the high speed connection, wherein the high speed connection adopts a high speed wireless communication manner of WIFI or WIFI Direct.

In the embodiment, if the first electronic business card terminal on which the first electronic business card is displayed receives the first touch signal, the first electronic business card terminal turns the first electronic business card upside down to enable the business card to face the other party, and establishes the data connection to the second electronic business card terminal; if the first electronic business card terminal on which the first electronic business card that has been turned is displayed receives the second touch signal, the first electronic business card terminal sends the first electronic business card to the second electronic card terminal through the data connection; and through the data connection, the first electronic business card terminal receives and displays the second electronic business card sent by the second electronic business card terminal. That is, users can exchange electronic business cards by only sending two touch signals, so that the problems of complex operation of electronic business card exchange and proneness to opposite end confusion in the prior art are solved. In addition, the process is formal and meets business card exchange etiquette, and the problem is solved that electronic business card cannot be popularized on a large scale all the time to replace paper business cards due to the concern of etiquette in electronic business card exchange.

It may be understood by those having ordinary skills in the art that the all or a part of steps of implementing the foregoing embodiments may be finished through relevant hardware instructed by a program. The program may be stored in a mobile device or a computer readable storage medium, and the program while performing includes the steps of the foregoing embodiments of the method. While the aforementioned storage medium includes: various mediums that can store program codes such as ROM, RAM, magnetic disk or optical disk.

It should be finally noted that the above embodiments are only configured to explain the technical solutions of the present invention, but are not intended to limit the present invention. Although the present invention has been illustrated in detail according to the foregoing embodiments, those having ordinary skills in the art should understand that modifications can still be made to the technical solutions recited in various embodiments described above, or equivalent substitutions can still be made to a part of technical features thereof, and these modifications or substitutions will not make the essence of the corresponding technical solutions depart from the spirit and scope of the claims.

What is claimed is:

1. An electronic business card exchange method, characterized in that, the method comprises:
   if a first electronic business card terminal on which a first electronic business card is displayed receiving a first touch signal, the first electronic business card terminal turning the first electronic business card upside down, and establishing a data connection to a second electronic business card terminal;
   if the first electronic business card terminal on which the first electronic business card that has been turned is displayed receiving a second touch signal, the first electronic business card terminal sending the first electronic business card to a second electronic card terminal through the data connection; and
   through the data connection, the first electronic business card terminal receiving and displaying a second electronic business card sent by the second electronic business card terminal;
   wherein the establishing the data connection to the second electronic business card terminal device comprises:
      based on near field communication NFC or Bluetooth or infrared, the first electronic business card terminal monitoring and searching the second electronic business card terminal, and establishing a matching with the second electronic business card terminal and establishing a low speed connection; and
      when the low speed connection is successfully established, through the established low speed connection, transmitting an information matching needed by a high speed connection to establish the high speed connection, wherein the high speed connection adopts a high speed wireless communication manner.

2. The electronic business card exchange method according to claim 1, which is characterized in that, the first touch signal is a two-finger long press.

3. The electronic business card exchange method according to claim 1, which is characterized in that, the first touch signal is a two-finger sliding upward.

4. An electronic business card exchange apparatus, characterized in that, the electronic business card exchange apparatus is configured on a first electronic business card terminal, and the apparatus comprises:
   a connecting module, for if a first electronic business card terminal on which a first electronic business card is displayed receiving a first touch signal, the first electronic business card terminal turning the first electronic business card upside down, and establishing a data connection to a second electronic business card terminal;
   a sending module, for if the first electronic business card terminal on which the first electronic business card that has been turned is displayed receiving a second touch signal, the first electronic business card terminal sending the first electronic business card to a second electronic card terminal through the data connection; and
   a receiving module, for through the data connection, the first electronic business card terminal receiving and displaying a second electronic business card sent by the second electronic business card terminal;
   wherein connecting module comprises:
      a first connecting module, for based on near field communication NFC or Bluetooth or infrared, the first electronic business card terminal monitoring and searching the second electronic business card terminal, and establishing a matching with the second electronic business card terminal and establishing a low speed connection; and a second connecting module, for when the low speed connection is successfully established, through the established low speed connection, transmitting an information matching needed by a high speed connection to establish the high speed connection, wherein the high speed connection adopts a high speed wireless communication manner.

5. The electronic business card exchange apparatus according to claim 4, which is characterized in that, the first touch signal is a two-finger long press.

6. The electronic business card exchange apparatus according to claim 4, which is characterized in that, the first touch signal is a two-finger sliding upward.

* * * * *